US 7,350,303 B2
// (12) United States Patent
// Rock et al.

// (10) Patent No.: US 7,350,303 B2
// (45) Date of Patent: Apr. 1, 2008

(54) LEVEL, ANGLE AND DISTANCE MEASURING DEVICE

(76) Inventors: Alan George Rock, 1 Shelley Close, Bicester, Oxfordshire (GB) OX26 2YZ; Angus James Rock, 14 Scholar Place, Off Arnold Way, Cumnor Hill, Oxford, Oxfordshire (GB) OX2 9RD ( * ) Notice: Subject to any disclaimer, the term of this patent is extended or adjusted under 35 U.S.C. 154(b) by 10 days.

(21) Appl. No.: 10/534,639

(22) PCT Filed: Nov. 14, 2003

(86) PCT No.: PCT/GB03/04945

§ 371 (c)(1),
(2), (4) Date: May 12, 2005

(87) PCT Pub. No.: WO2004/046651

PCT Pub. Date: Jun. 3, 2004

(65) Prior Publication Data

US 2006/0053645 A1     Mar. 16, 2006

(30) Foreign Application Priority Data

Nov. 15, 2002  (GB) ................................. 0226764.9
Feb. 28, 2003  (GB) ................................. 0304651.3

(51) Int. Cl.
*G01C 9/06* (2006.01)

(52) U.S. Cl. ................................ 33/366.11; 33/366.12; 33/318; 33/328

(58) Field of Classification Search ..............................
33/366.11–366.14, 328, 275 G, 275 R, 318, 33/329, 343, 316, 321, 324
See application file for complete search history.

(56) References Cited

U.S. PATENT DOCUMENTS

| 4,275,505 | A | * | 6/1981 | Delmas | ........................ | 33/558 |
| 4,549,277 | A | * | 10/1985 | Brunson et al. | ............ | 702/154 |
| 5,125,165 | A | * | 6/1992 | Gerhard | ........................ | 33/832 |
| 6,292,751 | B1 |   | 9/2001 | Frank | | |
| 6,354,011 | B1 | * | 3/2002 | Albrecht | ........................ | 33/318 |
| 6,366,831 | B1 | * | 4/2002 | Raab | ........................... | 700/262 |

(Continued)

FOREIGN PATENT DOCUMENTS

EP     1089215 A     4/2001

(Continued)

Primary Examiner—G. Bradley Bennett
Assistant Examiner—Tania C Courson
(74) Attorney, Agent, or Firm—Drinker Biddle Reath LLP; Joseph J. Buczynski

(57) ABSTRACT

The portable self-contained horizontal and vertical level, angle and distance measuring device is suitable for indicating whether or when two or more points are level with each other and for measuring distances and angles between two or more points, a point and a line or a point and a plane. Moreover, the measuring device is capable of displaying such measurements to a user in real time. The measuring device includes a measuring point (3) for identifying from where measurements are to be calculated, a user actuated trigger (11) and a display (9) for displaying measurements to the user either in real time or in memory mode. The measuring device is compact and light-weight making it particularly convenient and portable. It is also very versatile and is capable of replacing a multiplicity of measuring devices commonly employed in DIY, engineering, and in trade in general.

32 Claims, 7 Drawing Sheets

U.S. PATENT DOCUMENTS

| | | | |
|---|---|---|---|
| 6,526,668 B1* | 3/2003 | Beckhart et al. | 33/366.11 |
| 6,535,794 B1* | 3/2003 | Raab | 700/262 |
| 6,715,213 B2* | 4/2004 | Richter | 33/328 |
| 6,792,382 B2* | 9/2004 | Kunitomo | 702/154 |
| 6,965,843 B2* | 11/2005 | Raab et al. | 702/152 |
| 7,050,930 B2* | 5/2006 | Raab et al. | 702/152 |
| 2004/0083616 A1* | 5/2004 | Hamar | 33/366.11 |
| 2005/0166410 A1* | 8/2005 | Richter et al. | 33/366.12 |

FOREIGN PATENT DOCUMENTS

| | | |
|---|---|---|
| GB | 2045938 A * | 11/1980 |
| WO | WO 01/88477 A2 | 11/2001 |
| WO | WO 02/059869 A1 | 8/2002 |

* cited by examiner

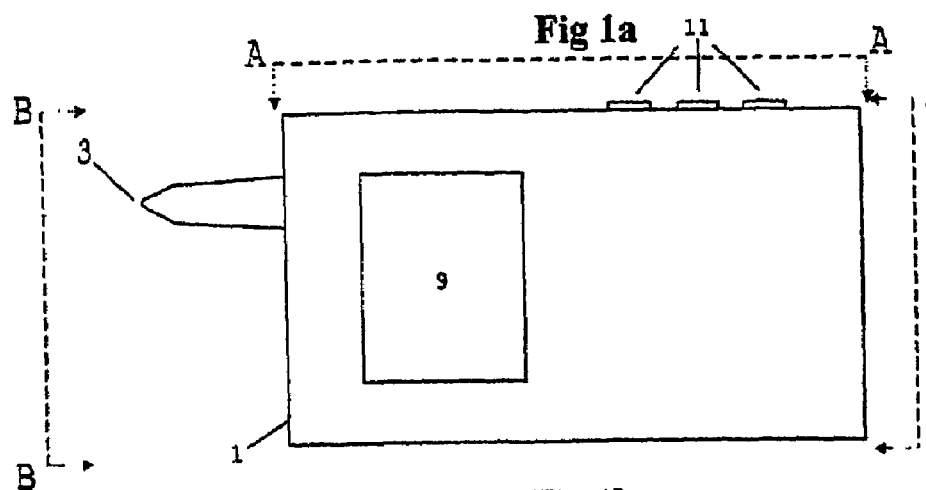
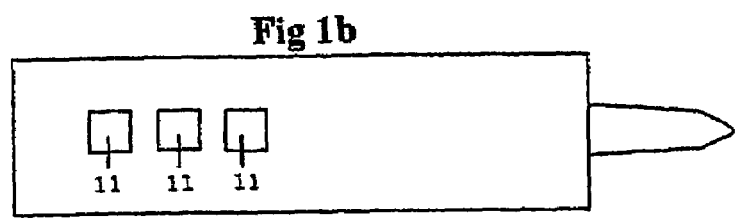
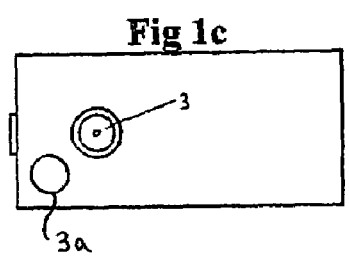
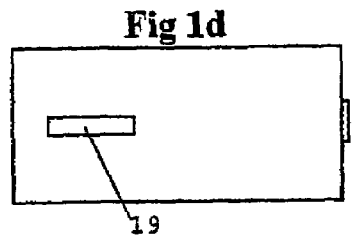
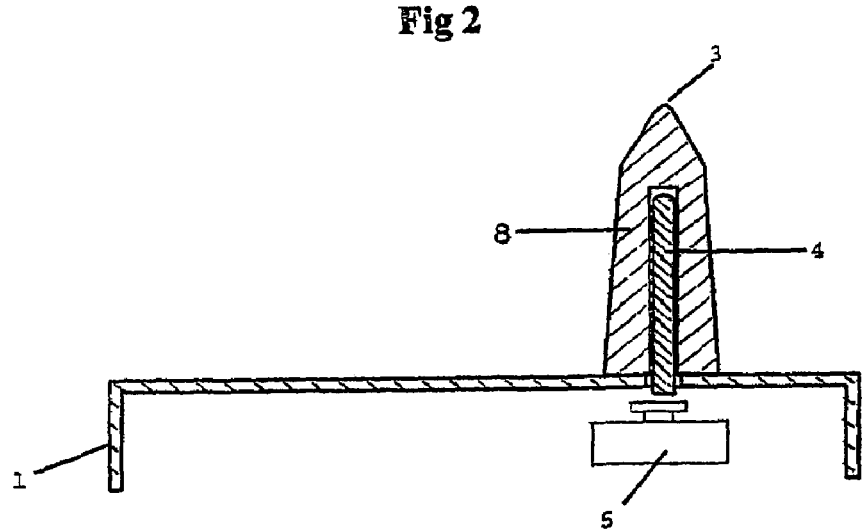

LEVEL, ANGLE AND DISTANCE MEASURING DEVICE

CROSS-REFERENCE TO RELATED APPLICATIONS

This application is a national phase of international patent application no. PCT/GB2003/004945, filed Nov. 14, 2003, which claims the benefit of patent application nos. GB 0226764.9, filed Nov. 15, 2002, and GB 0304651.3, filed Feb. 28, 2003, the entire content of which is incorporated herein by reference.

The present invention relates to a portable self-contained horizontal and vertical level, angle and distance measuring device (PMD) suitable for indicating whether or when two or more points are level with each other and for measuring distances and angles between two or more points, and preferably but not exclusively for displaying that indication and/or measurement to a user in real time.

As technology has moved on, a wide range of measuring tools have become available to the professional and do it yourself (DIY) tool user. For horizontal and vertical level indicators and measures there are spirit levels, electronic levels and laser levels. For distance measurement there are rulers, tape measures, ultrasonic and laser devices. For angle measurement there are protractors, angle finders, and T squares. It would not be unusual for a regular user of tools to require at least five of the aforementioned tools to be adequately equipped to undertake work.

The spirit level, and electronic level have physical size limitations which means that measurements beyond the length of the device are difficult if not impossible to take accurately, and are limited to one dimension readings. A plumb line is awkward to use single handed, and has to be set up to make long measurements. The laser level requires a surface to reflect off and has to be set up correctly, is often expensive; and in addition, all laser devices have safety issues.

A straight-line ruler is limited by its length. A flexible tape, whilst low cost and simple to use, is limited by potential variations in reading due to curves in the tape over long distances. The tape is prone to easily breaking, and injuring the user during rapid retraction of the tape into its housing. It is also particularly unwieldy to use over long distances with just one operator.

While the ultrasonic distance measuring device is quick to use, small, and now relatively cheap to produce, it is limited by the distance it can measure, and the requirement to bounce the emitted signal off a parallel surface. Its accuracy is affected by the air temperature and density, and it suffers from spurious readings due to additional reflective noise. It can also only measure one co-ordinate at a time.

While the laser measuring system is also quick to use, small, and accurate, it is currently expensive to produce, is adversely affected by bright ambient light e.g. sunshine, and is dependant on the surface material of the measured object. It can also only measure one co-ordinate at a time. Again, there are safety issues relating to products of this kind.

Protractors are impractical to use on large scale projects. Angle finders have become increasingly sophisticated giving good accuracy, but continue to be limited by the physical constraints of their size. T squares are also cumbersome to carry around, and additionally are limited to only giving 90 degree angles.

The present invention seeks to provide a new measuring device which is simple to use, portable, and obviates the need for most of the aforementioned tools, whilst at the same time offering three dimensional measuring capabilities and freeing the user up from the limiting physical constraints of the tools described previously.

The present invention thus provides a portable measuring device comprising: a housing; power supply means; a processor and one or more motion sensors adapted to provide a measure of the relative spatial separation of at least first and second locations; a user actuated trigger for identifying at least said first location; and a display for visually presenting information on a measured relative spatial separation characterised in that said one or more motion sensors detect motion in six degrees of freedom and said processor is adapted to determine at least one angle as a measure of said relative spatial separation for presentation by said display.

In an alternative aspect the present invention provides a portable measuring device comprising: a housing; power supply means; a processor and one or more motion sensors adapted to provide a measure of the relative spatial separation of at least first and second locations; a user actuated trigger for identifying at least said first location; and a display for visually presenting information on a measured relative spatial separation characterised in that said processor is adapted to determine at least one angle and a linear distance as a measure of said relative spatial separation for presentation by said display.

In a further aspect of the present invention there is provided a portable measuring device comprising: a housing; power supply means; a processor and one or more motion sensors adapted to provide a measure of the relative spatial separation of at least first and second locations; a user actuated trigger; and a display for visually presenting information on a measured relative spatial separation said measuring device being characterised by further including a measuring point provided on said housing having a defined spatial relationship with respect to said one or more motion sensors, said measuring point being provided for identification to said processor, in association with said user actuated trigger, at least one of said first and second locations.

Many inertial measuring unit (IMU) based measurement systems rely on 'zero velocity updates' (ZVUP) as described by C Verplaetse in "Inertial Proprioceptive devices: self-motion-sensing toys and tools", IBM Systems Journal, Vol. 35, Nos. 3&4 1996 and in U.S. Pat. No. 6,292,751. The 'zero velocity update' relies on identifying when the sensors are at rest and resetting the velocity values back to zero. This process improves the accuracy of an IMU system, and allows them to be used over a longer period of time without suffering ever increasing errors. However, such zero velocity updates are inherently impractical and inaccurate in a hand-held device which is rarely completely stationary.

Preferably the present invention additionally encompasses non-zero velocity updating of the measuring device in which the processor is in communication with a volatile memory in which is stored calibration data and a data store in which motion data is stored and the processor is adapted to update the calibration data and/or the stored motion data. When the measuring point is deemed substantially stationary, the processor can be adapted to determine an error correction to the calibration data and/or the motion data in relation to motion detected by said one or more motion sensors.

With the present invention the spatial separation in 3 axes of measurement, between two points, or between a straight line and a point, or between a vertical or horizontal plane and a point, or between any other flat plane and a point, can be measured and displayed. In a preferred embodiment acceleration, velocity, rotation and translation indications accounting for all six different degrees of freedom are provided by means of electromechanical inertial measuring devices. Furthermore, the measuring device can determine the acceleration due to gravity of the device and can compensate for this background signal. With the preferred embodiment the measuring device includes a series of at least three accelerometers and three rate gyros to monitor movement of the measuring device in the six degrees of freedom. Ideally the accelerometers and rate gyros are of MEMS (micro-electromechanical systems) technology to reduce the physical size requirements and to facilitate a lightweight, low power consuming, hand-held device.

Reference herein to spatial separation is intended to encompass difference in vertical height and horizontal separation, distance, angle to the horizontal or vertical, horizontal and vertical level indications, etc.

Embodiments of the present invention will now be described by way of example with reference to the accompanying drawings, in which:

FIGS. 1a, 1b, 1c and 1d are outline drawings of a first embodiment of a portable measuring device in accordance with the present invention;

FIG. 2 is a diagram of a first embodiment of a measurement pointer for use with a measuring device in accordance with the present invention;

Figure 3:
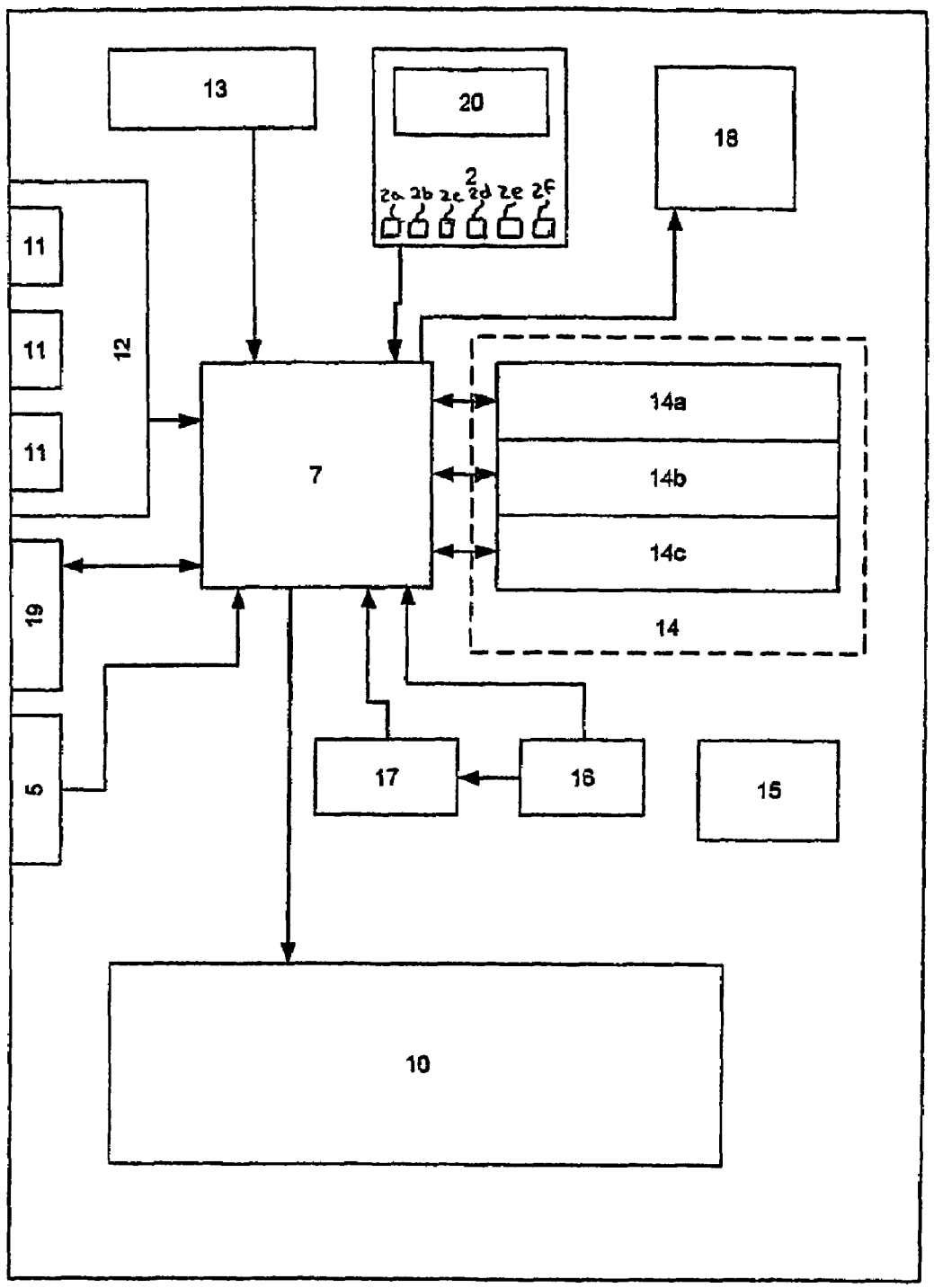
FIG. 3 is a functional block diagram of a first embodiment of the pcb contained in a portable measuring device in accordance with the present invention.

To assist in an understanding of how spatial separation is measured using an inertial measuring unit (IMU) the following is an explanation of its basic principles.

Spatial separation is measured by monitoring movement of the IMU. The movement of the IML is detected by sensors measuring motion in six degrees of freedom i.e. three rotational and three translational movements, relating to movement of a reference point associated with the IMU, and typically within it. Typically these sensors comprise three rate gyros and three accelerometers organised and aligned in three axes, each perpendicular to the other two axes.

These sensors measure motion with respect to a co-ordinate frame fixed to the IMU (referred to as the "body frame"). These measured motions need to be translated into motion in a co-ordinate frame aligned to the force of gravity i.e. one axis parallel to the gravitational force (vertical) and the other two axes perpendicular to the gravitational force (horizontal) and each other (referred to as the "local frame") in order to allow for the gravitational effects on the measured motion of the IMU. It is well understood that motion with respect to the body frame can be translated into motion with respect to the local frame using a direction cosine matrix, derived from Euler angles or Euler Parameters (quaternions).

In a typical embodiment of a measuring device in accordance with the present invention a spatial separation is measured by the following process:

The accelerometer and rate gyro sensors of the IMU are sampled at regular intervals, for example every 1 ms The start of measurement is indicated by a user actuated trigger, indicating, at that moment in time, that the measuring device is stationary i.e. with zero velocity and zero translational acceleration.

The initial orientation of the measuring device with respect to the local frame, e.g. pitch, roll and yaw, is calculated by resolving the three components of gravitational acceleration with respect to the body frame, as measured by the accelerometers, using simple trigonometry. The initial position co-ordinates of the measuring point with respect to the local frame are set to zero.

During subsequent movement of the measuring device, measurement of the orientation and translational movement of the measuring point of the measuring device are re-calculated for each sample of the sensor values of the IMU e.g. each millisecond, using the following algorithm:

The angular velocities with respect to the body frame are calculated from the values measured by the rate gyro sensors of the IMU.

The quaternions are calculated from the angular velocities with respect to the body frame and the initial orientation of the measuring device with respect to the local frame.

The direction cosine matrix is calculated from the quaternions.

The gravitational acceleration component with respect to the local frame is in the vertical axis only (by definition).

The gravitational acceleration components of the IMU with respect to the body frame are calculated from the vertical gravitational acceleration component with respect to the local frame and the direction cosine matrix.

The total accelerations of the IMU with respect to the body frame are calculated from the values measured by the accelerometer sensors of the IMU.

The translational accelerations of the IMU with respect to the body frame are calculated by subtracting the gravitational acceleration components with respect to the body frame from the total accelerations of the IMU with respect to the body frame.

The translational velocity of the IMU with respect to the body frame is calculated by integrating the translational accelerations of the IMU with respect to the body frame.

The translational velocity of the IMU with respect to the local frame is calculated from the translational velocity of the IMU with respect to the body frame and the direction cosine matrix.

The translational movement of the IMU with respect to the local frame is calculated by integrating the translational velocity of the IMU with respect to the local frame.

The angular orientation of the measuring device with respect to the local frame is calculated from the quaternions.

The translational movement of the measuring point with respect to the local frame is calculated from the translational movement of the IMU with respect to the local frame, the angular orientation of the measuring device with respect to the local frame, and the fixed spatial relationship between the IMU and the measuring point.

The relative spatial separation of the measuring point from its initial position with respect to the local frame, is calculated from the translational movement with respect to the local frame, using simple trigonometry.

All measurements that are then displayed by the measuring device e.g. difference in vertical height and/or horizontal separation, distance, angle to the horizontal or vertical, horizontal and vertical level indications, etc. are calculated from the relative spatial separation with respect to the local frame.

A portable measuring device (PMD) is shown in FIGS. 1a, 1b, 1c and 1d consisting of a housing 1 in the interior of which is located a plurality of motion sensors 2a, 2b, 2c, 2d, 2e and 2f in the form of inertial measurement components as a self-contained unit. The inertial measurement components, preferably in the form of an inertial measuring unit (IMU) 2, and their associated electronic interface components are typically prone to drift due to temperature variation. In use, the PMD may be subject to rapid temperature variations e.g. heat from a user's hand. To minimize the effect of a variation in external temperature on the internal components of the PMD, the material of the housing 1 is preferably selected to be thermally insulating and thus have a high thermal resistance. Also, the housing 1 may be sealed to eliminate variations in internal temperature due to convection.

A measuring point 3 is provided on the exterior of the housing 1 against which all spatial measurements of the PMD are referenced. The measuring point 3 may be an integral part of the housing 1 or may be connected thereto and is visually distinguishable and capable of alignment by a user with a selected location from or to which measurements are to be taken. Additionally virtual measuring points representing locations remote from the PMD may be identified by the PMD by means of a laser beam or other beam generated by a laser emitter in a laser emitter and detector 3a, and detected by the detector in laser emitter and detector 3a, which is discussed in more detail below.

The housing 1 of the PMD also includes a trigger 4 which is user actuated for example, but not limited to, manually, mechanically, electronically or by voice. The trigger 4 is connected to a microswitch 5 mounted internally of the housing on a pcb 6. Preferably, the trigger 4 is in close proximity to the microswitch 5 such that each time the trigger 4 is depressed, the trigger 4 activates the microswitch 5 which in turn supplies a signal to a processor 7 also mounted on the pcb 6.

When the PMD is placed against a solid surface to make a measurement, the deceleration force exerted on the IMU 2 may typically be in the order of 10's or 100's of g, and therefore in excess of the measuring range of the IMU 2. To enable the IMU 2 to be able to measure such a deceleration force, a deceleration device 8 (FIG. 2) is additionally provided on the housing 1 of the PMD, mounted in a configuration such that in normal operation of the PMD, the deceleration device 8 is the first component of the PMD to make contact with a location point from or to which measurements are to be made. The deceleration device 8 is preferably compressible and thus provides a means to limit the deceleration force on the IMU 2 to within its measurement range. In this respect the deceleration device may include a compressible material or a compressible element such as a spring. The deceleration device 8 may be an integral part of the housing 1 or may be connected thereto. As illustrated in FIG. 2 in a preferred embodiment of the measuring device the deceleration device 8 and the trigger 4 are combined such that compression of the deceleration device 8 actuates the trigger 4. Alternatively, the trigger 4 can be actuated by the user moving the PMD in a pre-defined manner so as to expose the IMU 2 to a particular pattern of acceleration forces. Of course the deceleration device 8 may be omitted either where the IMU 2 has a measuring range which encompasses the deceleration forces likely to be encountered or where such large deceleration forces do not need to be controlled.

The housing 1 also includes a transparent window 9 aligned with a display 10 mounted on the pcb 6. Alternatively, the display 10 may form part of the housing 1. One or more switches in the form of push buttons 11 are provided on the housing 1 (three are illustrated in FIGS. 1a and 1b). The push buttons 11 enable a user to control the operation of the PMD. The push buttons 11 are either connected to or mounted in close proximity to control switches 12 on the pcb 6, such that a respective control switch 12 is activated when a user depresses its associated push button 11.

Turning now to FIG. 3 as mentioned above, a pcb 6 is used to mount and connect the internal components of the PMD. The internal components include the inertial measuring unit (IMU) 2 which is used to provide to a processor 7 electrical signals relating to the translational and rotational movement and orientation of a reference point associated with the IMU 2. The processor 7 is programmed with the fixed spatial relationship between the reference point of the IMU 2 and the measuring point 3 on the housing 1 so that the translational and rotational movement and orientation of the measuring point 3 can be determined by the processor 7. Alternatively, each individual inertial measurement component in the IMU may have its own reference point, in which case the processor is programmed with a series of relationships for the spatial difference between the measuring point 3 and each of the individual reference points. A special case of this is where the reference point(s) are coincident with said measuring point 3.

In an alternative embodiment, a laser emitter and detector 3a is provided in or connected to the PMiD as shown in FIG. 1c to enable non-contact relative measurements to be performed by means of conventional capture laser distance measurement techniques such as those described in U.S. Pat. No. 6,191,845. Each remote point of reflection of the laser beam is treated by the IMU 2 as a virtual measuring point and, as the laser beam is deemed to travel in a straight line, the relative spatial separation of different points of reflection can be determined by the PMD using conventional trigonometric theory. With this embodiment it is not the translational and rotational movement of the virtual measuring point that is determined but rather measurement of the translational and rotational movement of the PMD, relative to the virtual measuring points, which enables measurement of the spatial separation of the two locations.

Typically, the IMU 2 contains a plurality of accelerometers and rate gyros, preferably mounted in the x, y and z axes, which provide electrical signals to the processor 7, proportional to the translational acceleration and rotational velocity of the IMU 2. Alternative embodiments of the IMU 2 may include any combination of motion sensors including but not limited to force measuring devices such as translational and angular accelerometers, rate gyros and magnetic field detectors such as magnetometers. Alternative arrangements of the motion sensors, for example in a pyramidal structure, are also envisaged. Whilst the IML 2 is described as being mounted on the pcb 6, alternative configurations are envisaged which would require additional pcbs or indeed obviate the need for any pcbs. To provide a compact and lightweight structure the IMU 2 is preferably fabricated using MEMS technology such as that described in U.S. Pat. No. 6,456,939, and U.S. Pat. No. 6,295,870 and patent application US2002/0065626.

The IMU 2 may be provided with an additional accelerometer 20, for measuring significantly higher deceleration forces in one axis only. This axis is aligned within the PMD to measure decelerations in the direction of normal motion of the PMD and/or the deceleration device 8 as a user places it against a surface location to be measured. This additional accelerometer 20 may be external to the IMU 2.

A temperature sensor 13 is provided and is connected to the processor 7. The temperature sensor 13 outputs a signal to the processor 7 proportional to the internal temperature of the PMD. This is used to enable the processor 7 to provide temperature compensation for the signals received from the IMU 2, which are typically temperature dependent. Although illustrated separate from the IMU 2, temperature sensors may be incorporated into one or more of the individual inertial measurement components of the IMU 2 to provide more accurate temperature compensation.

The microswitch 5 which is mounted on the pcb 6 and is activated by the trigger 4 is connected to the processor 7 and outputs an electrical trigger signal to the processor 7 each time the trigger 4 is manually activated by a user or mechanically activated by positioning the trigger 4, or a component such as the deceleration device 8, against a surface.

The processor 7 is also connected to a memory 14. The memory 14 includes 3 allotted memory regions, a first memory region 14a in which the calibration data for the IMU 2 is stored, a second memory region 14b in which reference location data is stored, and a third memory region 14c in which the trajectory data may be stored. The calibration data for the IMU 2 stored in the first region 14a of the memory may be predetermined. Alternatively the calibration data for the IMU 2 may be obtained during the normal operation of the PMD, and stored in the memory 14a. A further program memory may be associated with the processor in which the instructions and algorithms for calculating the relative spatial separation between first and second locations are stored.

A display 10 is connected to the processor 7 and is used to continuously display real-time data supplied by the processor 7 on the relative spatial separation of the measuring point of the PMD from a previously stored reference location in space which was stored in the reference data memory region 14b.

A power source 15, preferably in the form of a battery, is connected via power supply means to the internal electrical and electromechanical components to supply power for the electronic and electromechanical components. Alternative power sources such as solar cells are also suitable for powering the measuring device.

A clock 16 is connected to the processor 7, and provides a clocking signal to the processor 7, to enable the processor to take successive measurements from the IMU 2 at predetermined regular time intervals, e.g. 1 mS to 1000 mS. Additionally the processor has access to or includes the functionality of a timer to monitor the time taken for a measurement to be taken. Ideally, the timer is in communication with the clock 16 and consists of an incremental counter 17 which counts the number of clock pulses issued during the taking of a measurement. In this way the number of clock pulses counted is representative of the duration of the measurement. Each time the trigger 4 is actuated to identify a new 'start point' the counter 17 is preferably re-set to zero. Furthermore, the processor 7 may use the information from the counter 17 to determine an appropriate resolution for the measurement being taken. In this way the resolution of the measurement may be varied in dependence upon the time taken for the measurement which in turn in general may reflect the scale of the measurement (e.g. millimetres, centimetres or metres) or the accessibility of the second location, for example.

One or more control switches 12 are also mounted on the pcb 6 and are connected to the processor 7. The control switches 12 are used to enable a user to select the operation of the processor 7 from a predetermined set of functions, and each control switch 12 supplies a signal to the processor 7 each time the associated push button 11 is pressed by a user. The control switches 12 may be used for example to select whether a measurement is to be made from a point, a line or a plane; the engineering units used to display the measurement e.g. millimetres and centimetres and metres, feet and inches, degrees or angular ratios; the type of measurement to be taken e.g. a first location or second location; how the measurement is to be displayed e.g. as a level or as a distance, angle, area or volume. An audible sounder 18 may be provided and connected to the processor 7, and used to provide audible feedback to a user during operation of the PMD.

A port 19 may be provided and connected to the processor 7, and is used to extract the data stored by the processor 7 for further analysis.

When in use, the processor 7 receives signals from the IMU 2, corresponding to the translational and rotational movement and orientation of the reference point of the IMU 2, including translational accelerations, rotational velocities, velocity increments, positional increments and angular increments or to the relative positional and rotational movement and orientation of the reference point of the IMU 2 with respect to an earlier position. It is also envisaged that an IMU might be employed that uses components for providing some but not all of the measurements listed above.

Figure 4:
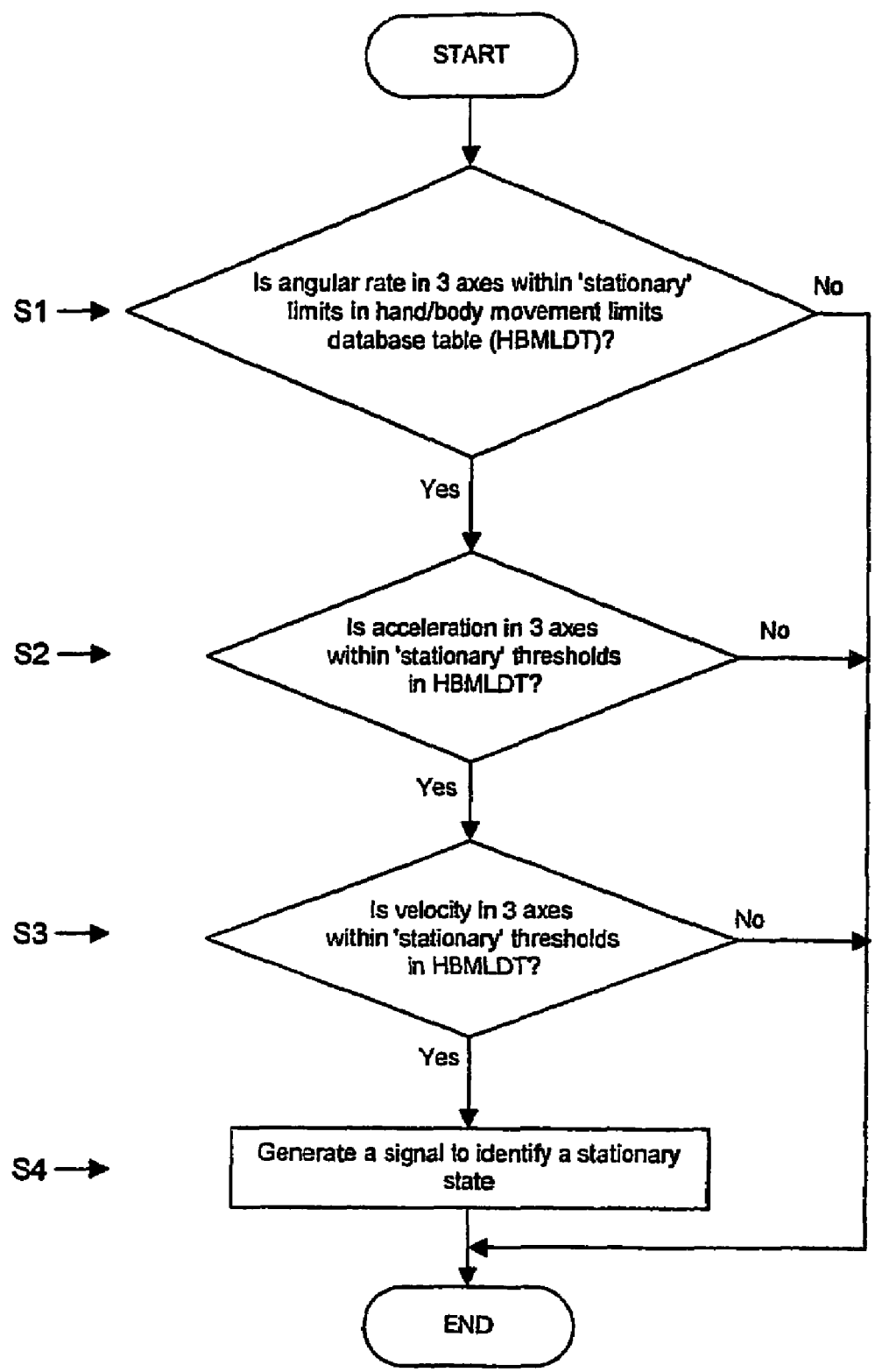
FIG. 4 is a flowchart describing an algorithm to determine when a measuring device in accordance with the present invention is stationary.

The processor 7 receives an indication from a user by means of one of the control switches 12 that the start of a measurement is to be taken, indicating that the measuring point 3 on the PMD is at the first location referred to as the 'start point', and that the user is holding the device substantially stationary. The processor 7 is programmed with pre-defined limits of human hand and body movements, and compares these limits with the acceleration and angular rate parameter values received from the IMU 2 to determine when the PMD is substantially stationary. The flow chart in FIG. 4 details an algorithm (S1-S4) that may be used to determine that the PMD is stationary. The processor 7 resets the translational and rotational velocity parameter values to zero, determines the orientation of the PMD relative to the vertical, and resets the position co-ordinates of the measuring point 3 on the PMD to zero. The processor 7 stores all the parameter values generated by or derived from the IMU 2 as a data set into the 'start point' location of the reference location data memory region 14b.

Figure 7:
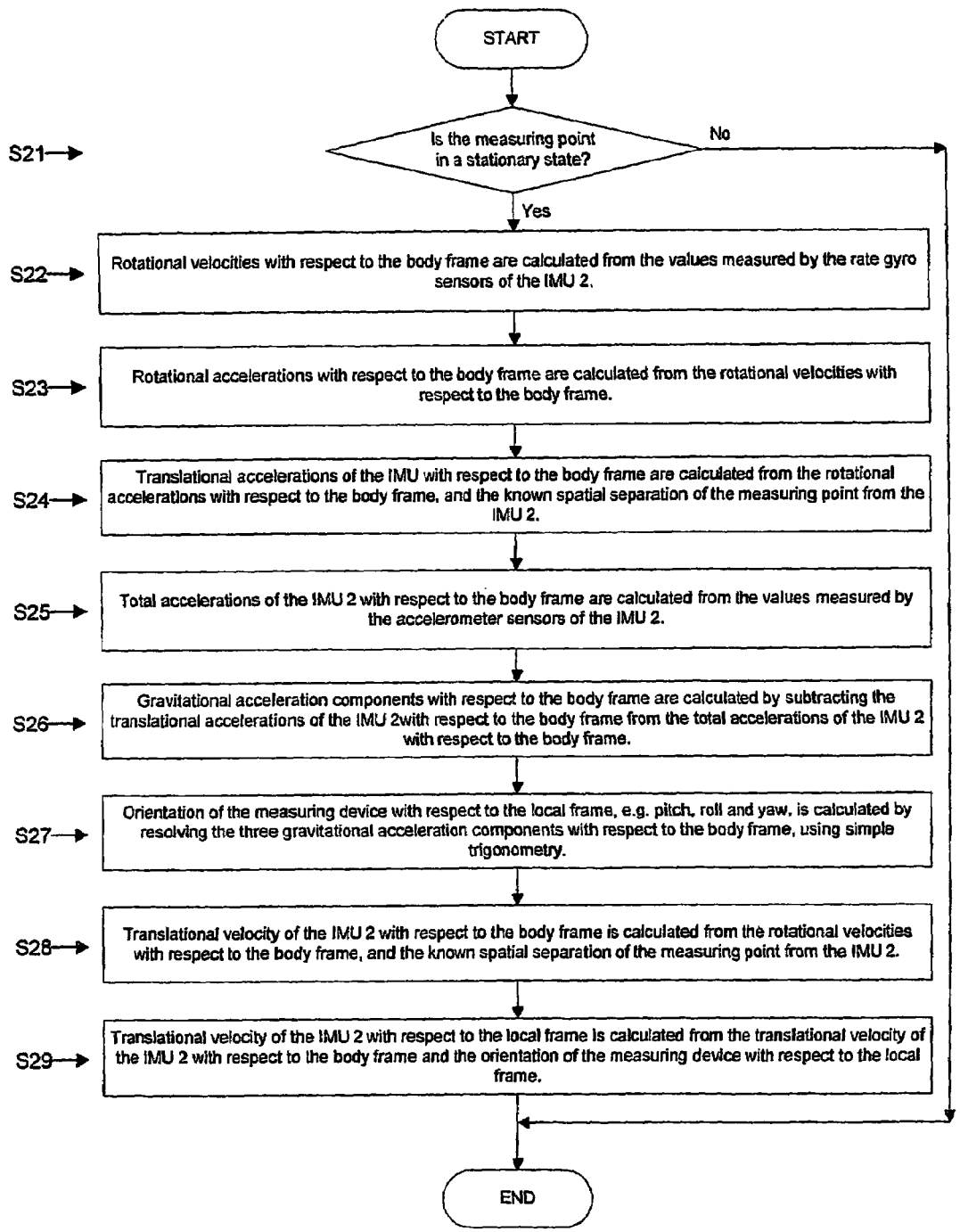
FIG. 7 is a flowchart describing an algorithm to determine a non-zero velocity update (NZVUP) and the initial pitch and roll orientation angles for use with a measuring device in accordance with the present invention.

In an alternative embodiment, the processor 7 waits for the trigger 4 to be activated, indicating that the measuring point 3 is known to be stationary, for example while it is held against a solid object. Under these circumstances a relationship is established between the measuring point 3 which is at zero velocity, and the reference point of the IMU 2 which is experiencing movement due to the hand movement of the person holding the PMD. The processor 7 carries out a 'non-zero velocity update' (NZVUP) to determine the initial velocity of the reference point of the IMU and initial orientation of the PMD to the vertical. The flowchart in FIG. 7 (S21-29) describes an algorithm for performing a non-zero velocity and orientation calibration update. The processor 7 stores all the parameter values generated by or derived from the IMU 2 as a data set into the 'start point' location of the reference location data memory region 14*b*.

The processor 7 may then activate the audible sounder 18 to inform a user that the 'start point' measurement is complete, and the device can be moved.

As a user moves the PMD, the processor 7 receives new parameter values from the IMU 2. The processor 7 uses these parameter values, together with the corresponding parameter values stored in the 'start point' location of the reference location data memory region 14*b*, and the known spatial relationship between the measuring point 3 and the reference point of the IMU 2, to derive a spatial separation in terms of a three dimensional spatial difference measurement between the current position of the measuring point 3 and its position at the 'start point'. The processor 7 may in addition derive the difference in both a vertical plane and a horizontal plane between the current and the 'start point' positions of the measuring point 3.

The processor 7 displays the difference measurement to a user on the display 10 in real time such that a user is provided with a continuous and substantially instantaneous display indicating the difference measurement of the measuring point 3 from the 'start point'. In this respect the second location for which a relative measurement from the first location, or 'start point', is required is treated as the instantaneous position of the PMD. However, in an alternative embodiment the trigger 4 may be used to identify for the processor 7 the second location for which a measurement is required in which case a continuously updated real time display is not necessary and instead the measurement is displayed only after the trigger 4 has been actuated to identify the second location. Of course the measurements can be displayed to a user in a number of different formats.

As mentioned earlier, the PMD may also be used to derive and display difference measurements relative to a reference line or a reference plane. Via the control switches 12 a user is able to instruct the processor 7 that additional reference points are to be captured after the first 'start point' measurement has been captured to define a reference line or reference plane. The processor 7 takes a measurement using the same method as for the 'start point' location, but stores the parameter values generated by and derived from the IMU 2 into a secondary location of the reference location data memory region 14*b*. The 'start point' location and secondary reference point location can be used by the processor 7 to define a reference line relative to the 'start point', and subsequent difference measurements may be derived and displayed relative to the 'start point' on this reference line. In a similar manner, a third reference point can be captured, to define a reference plane relative to the 'start point', and the processor 7 can derive and display the difference measurements relative to the 'start point' on this reference plane.

Figure 8A:
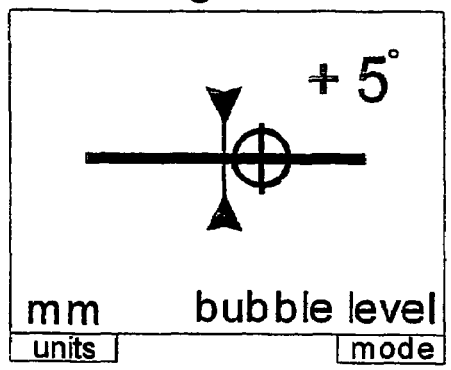
FIGS. 8a, 8b, 8c, 8d, 8e, 8f, 8g, 8h are examples of display screens of a measuring device in accordance with the present invention.
Figure 8B:
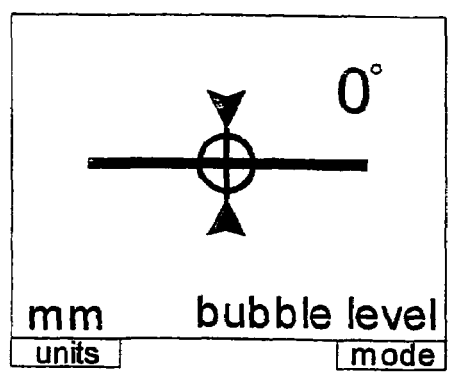
Figure 8C:
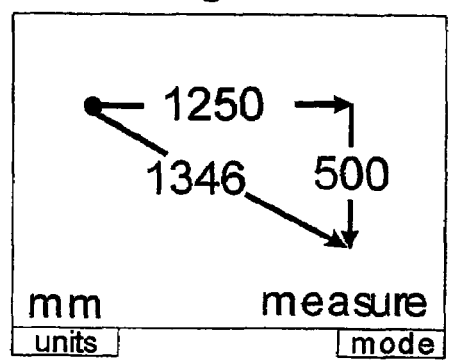
Figure 8D:
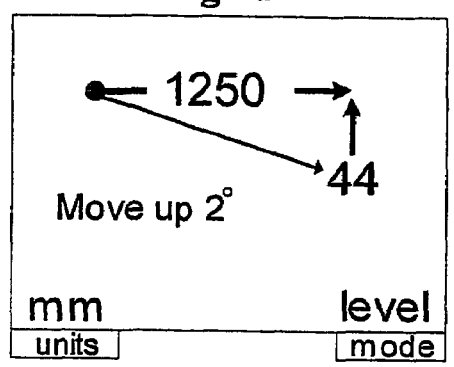
Figure 8E:
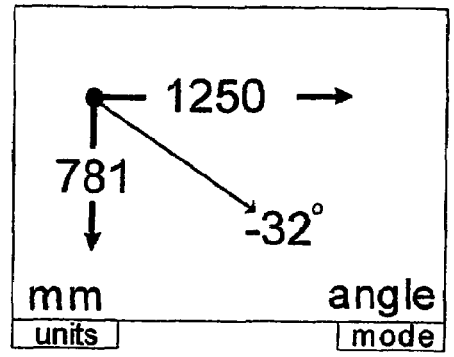
Figure 8F:
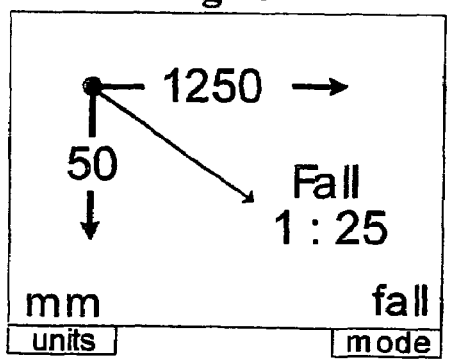
Figure 8G:
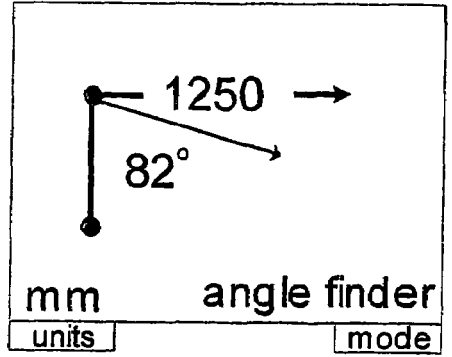
Figure 8H:
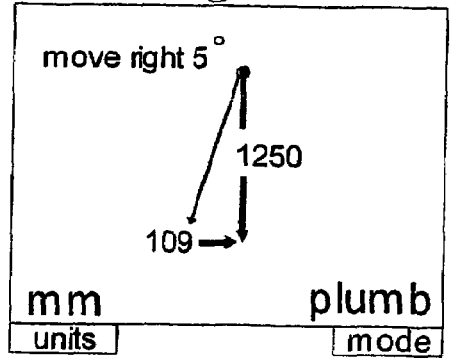

The PMD is also particularly suited to function as an electronic level. In this respect part of the inherent functions of the PMD is the measurement of angular relationships between points and points, lines or planes. A level simply identifies in respect to a horizontal or vertical plane, when there is no angular difference between two points with respect to the horizontal or vertical plane i.e. the measured angle is 0°. The PMD may display this information by displaying a real-time angular difference measurement or the display may alternatively or additionally provide a graphical indication of level, as illustrated in FIGS. 8*a* and 8*b*.

When all measurements are complete the data held in the memory 14 may be recalled by a user on the display 10, or downloaded via the port 19 into a computer for subsequent analysis and/or display.

The signals produced by the IMU 2 are prone to drift with both time and temperature which, due to the calculations for translational and angular movement carried out by the processor 7, increases measurement errors with time. To minimize these errors, the processor 7 may adjust the calibration data for each of the sensing elements contained within the IMU 2 stored in the calibration data memory region 14*a*. Alternatively or additionally, the processor 7 may apply a correction factor to the individual signals received from the IMU 2 or to the calculated relative translational and rotational movement of the measuring point as determined by the processor. One or more means for adjusting the calibration data or measurement signals during normal use of the PMD may be provided in the PMD.

As mentioned earlier, the processor 7 uses the signal from the temperature sensor 13 to determine the internal temperature of the PMD and hence the temperature of the components of the IMU 2. The processor 7 is programmed with a series of temperature related correction factors for each component of the IMU 2, and the processor 7 uses these correction factors to adjust the calibration data for each of the components of the IMU 2 stored in the calibration data memory region 14*a* at regular time intervals e.g. 1 second to 60 seconds. Alternatively the processor 7 may use the temperature related correction factors to adjust each instantaneous measurement signal received from the IMU 2.

Figure 5:
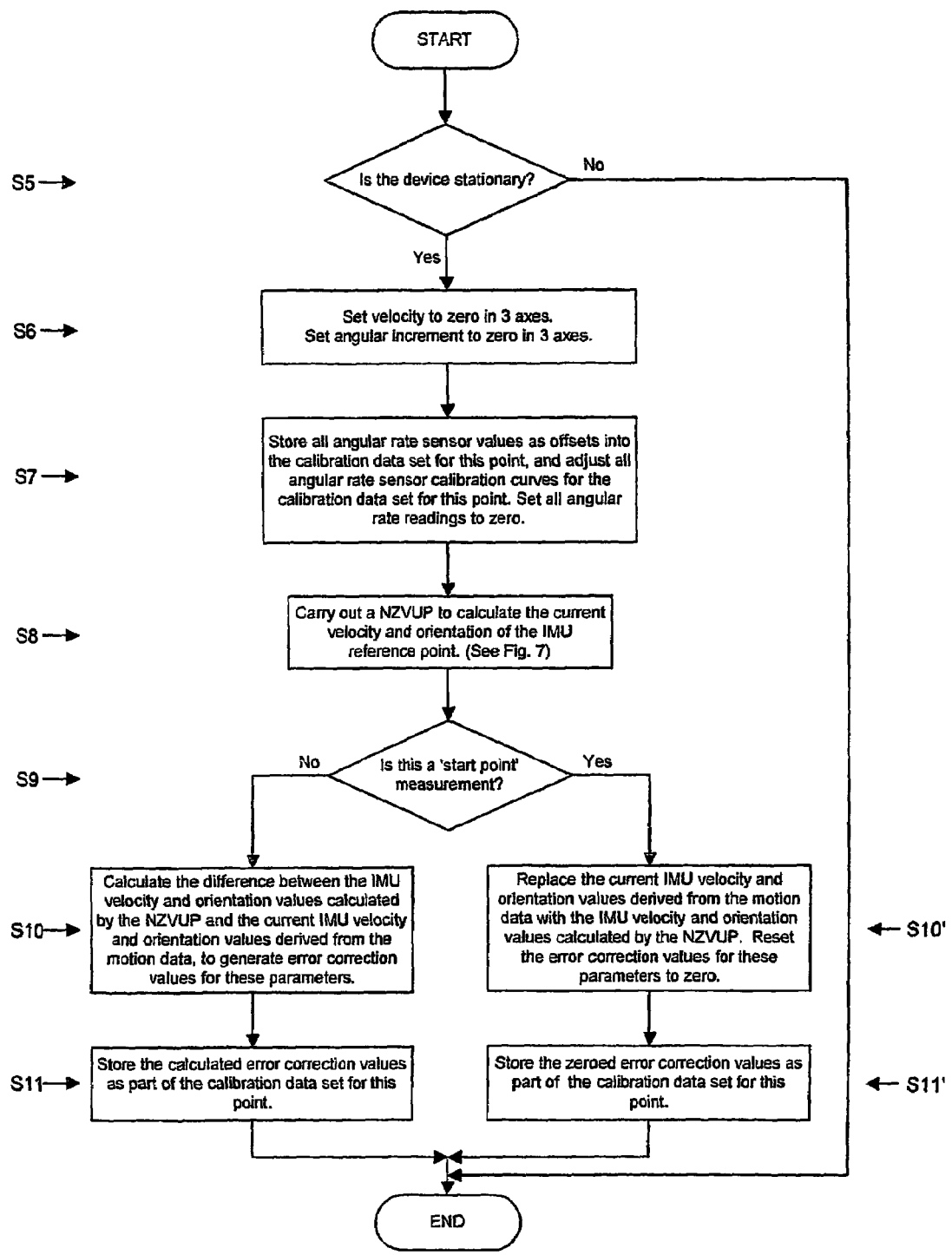
FIG. 5 is a flowchart describing a method for re-calibrating a stationary measuring device in accordance with the present invention.

Also, whenever the measuring point 3 on the PMD is determined to be stationary during a 'start point' measurement, certain parameter values generated by, or derived from, the IMU 2 can be corrected, for example the orientation of the PMD, and/or to compensate for localized environmental conditions, and the processor 7 can adjust values for the 'start point' calibration data set stored in the calibration data memory region 14*a* to remove any offsets for those signals. The flowchart in FIG. 5 (S5-S11) describes an example of an algorithm for this re-calibration.

Also, whenever the measuring point 3 on the PMD is determined to be stationary other than during a 'start point' measurement, the processor 7 may similarly derive new calibration data for each of the sensing elements of the IMU 2 and store them as a new calibration data set in the next available location in the calibration data memory region 14*a*. The processor 7 may also carry out a non-zero velocity update (NZVUP) at least to separately calculate the current velocity of the reference point of the IMU and orientation of the PMD, in order to correct the current values for these parameters. The processor 7 may also derive the accumulated error values for these parameters, and store them as part of the new calibration data set in the calibration data memory region 14*a*.

At the same time as the processor 7 derives and displays the difference measurements, the parameter values generated by, and derived from, the IMU 2 may also be recorded, as a data set, by the processor 7 into the trajectory data memory region 14*c* at regular time intervals.

The processor 7 uses the sets of calibration data stored in the calibration data memory region 14*a*, and the sets of parameter values recorded in the trajectory data memory region 14*c*, and by means of interpolation between adjacent sets of calibration data, derives a new set of calibration data associated with each set of parameter values, and then uses each new set of calibration data and each set of parameter values to re-calculate the spatial separation of the measuring point 3 on the PMD from the 'start point' to its current position.

Figure 6:
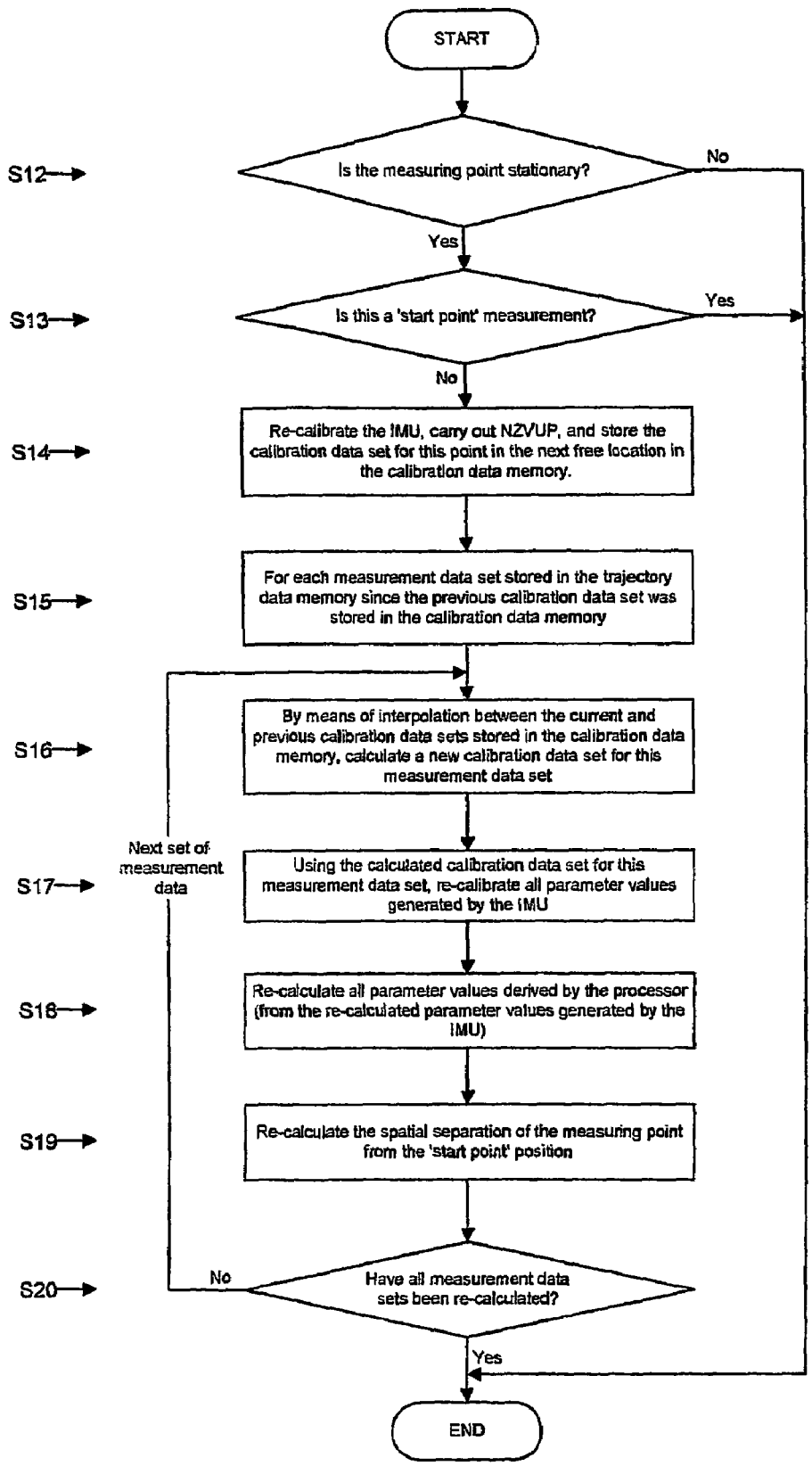
FIG. 6 is a flowchart describing a method for re-calculating from stored trajectory data the current position of a measuring device in accordance with the present invention.

The processor 7 uses this revised spatial separation and displays it to a user on the display 10. The flow chart in FIG. 6 (S12-S20) describes an algorithm for this re-calculation.

The trajectory data memory region 14c and the calibration data memory region 14a are typically over-written with new data each time a new 'start point' measurement is taken.

The nature of the calculations carried out by the processor 7 means that errors in the measurement can accumulate with time. To partially compensate for these errors, the processor 7 can adjust the resolution of the values displayed on the display 10 in relation to the elapsed duration of the measurement. The longer the duration of the measurement, the lower the resolution displayed.

By incorporating laser distance measurement into the PMD the possibility of measuring to points that cannot be reached by the user of the PMD such as a tall roof become possible. As mentioned earlier, where laser measurement is combined with inertial measurement the positions of two remote locations which are inaccessible to the user can be captured and the spatial separation of such remote locations can then be determined using trigonometric theory and the monitored inertial movement of the PMD between the capture of the first and second of the remote locations. Of course, the full functionality of the PMD in terms of measuring relative levels, and angles and distances relative to lines or planes also applies. Moreover, measurements between virtual measuring points generated by means of the laser emitter and locations identified using the measuring point 3 provided on the PMD housing are also possible. Although reference is made herein to a laser emitter and detector it will be apparent that alternative forms of non-contact distance measures may be employed including ultrasonic devices. By incorporating a non-contact meter in the PMD the possibility arises to utilise the PMD to measure around corners, around objects, over busy roads or wide rivers and to capture a plurality of measurements quickly and easily with a minimum of movement.

Further adaptations and alterations of the PMD are envisaged without departing from the scope of the invention defined in the appended claims.

The invention claimed is:

1. A portable measuring device comprising:
   a housing;
   power supply means;
   one or more motion sensors adapted to detect motion in six degrees of freedom;
   a processor adapted to provide a measure of the relative spatial separation;
   a user actuated trigger for identifying at least a first location; and
   a display for visually presenting information on a measured relative spatial separation;
   wherein said processor is further adapted to determine at least one angle of a second location with reference to a line or plane incorporating said first location for presentation by said display and to determine an error correction in relation to motion detected by said one or more motion sensors.

2. The portable measuring device as claimed in claim 1, wherein said processor is adapted to determine said at least one angle with respect to one or both of vertical and horizontal planes.

3. The portable measuring device as claimed in claim 2, wherein said processor is adapted to determine whether said first location and said second location are level with respect to either of said vertical or horizontal planes.

4. The portable measuring device as claimed in claim 1, wherein said processor is adapted to determine, in addition to said at least one angle, a linear distance separating said first and second locations.

5. A portable measuring device as claimed in claim 1, further comprising a measuring point provided on said housing and having a defined spatial relationship with respect to said one or more motion sensors, said measuring point being visually distinguishable on said housing and user alignable with a user selected spatial location.

6. A portable measuring device as claimed in claim 5, wherein said measuring point is adapted to be substantially stationary when aligned by a user with a selected spatial location.

7. A portable measuring device as claimed in claim 6, wherein the processor is adapted to determine an error correction when said measuring point is aligned with a selected spatial location and is substantially stationary, in relation to motion detected by said one or more motion sensors.

8. A portable measuring device as claimed in claim 1, wherein the processor is in communication with a memory in which is stored calibration data and the processor is adapted to update calibration data stored in said memory at a second or subsequent location.

9. A portable measuring device as claimed in claim 8, wherein said processor is adapted to adjust for movement of the one or more motion sensors as a result of uncontrolled hand movements of the user when updating calibration data stored in said memory.

10. A portable measuring device as claimed in claim 1, comprising a plurality of motion sensors comprising at least three accelerometers and three angular rate sensors.

11. A portable measuring device as claimed in claim 1, further including a timer, in communication with the processor, for monitoring the time duration of a measurement wherein the processor is adapted to determine the measure of relative spatial separation to a resolution dependent upon the time duration of the measurement.

12. A portable measuring device as claimed in claim 1, wherein the processor is adapted to determine from information received from the motion sensors when the measuring device is stationary and to generate an error correction.

13. A portable measuring device as claimed in claim 1, wherein the processor has access to threshold data identifying lower limits of measurable spatial movement representative of small, uncontrolled hand movements of a user.

14. A portable measuring device as claimed in claim 1, further comprising a deceleration device for reducing high deceleration forces.

15. A portable measuring device as claimed in claim 1, wherein the processor is adapted to supply real time data on the measured relative spatial separation.

16. A portable measuring device as claimed in claim 1, wherein the processor additionally includes a data store in which motion data is stored and said processor is adapted to update said stored motion data in dependence on calculated error corrections or updated calibration data and to recalculate said measured spatial separation in dependence on the updated motion data.

17. A portable measuring device as claimed in claim 1, further including a non-contact distance meter for measuring a distance to a position remote from the measuring device, the position being at least one of said first and second locations.

18. A portable measuring device comprising:
a housing;
power supply means;
a processor and one or more motion sensors adapted to provide a measure of the relative spatial separation of at least first and second locations;
a user actuated trigger for identifying at least said first location; and
a display for visually presenting information on a measured relative spatial separation
wherein said processor is further adapted to determine at least one angle of said second location with reference to a line or plane incorporating said first location and a linear distance for presentation by said display and to determine an error correction in relation to motion detected by said one or more motion sensors.

19. A portable measuring device comprising:
a housing;
power supply means;
a processor and one or more motion sensors adapted to provide a measure of the relative spatial separation of at least first and second locations;
a user actuated trigger; and
a display for visually presenting information on a measured relative spatial separation
said measuring device further including a measuring point provided on said housing having a defined spatial relationship with respect to said one or more motion sensors, said measuring point being provided for identification to said processor, in association with said user actuated trigger, at least one of said first and second locations and said processor being adapted to determine an error correction in relation to motion detected by said one or more motion sensors.

20. The portable measuring device as claimed in claim 19, wherein said measuring point is visually distinguishable on said housing and user alignable with a user selected spatial location.

21. The portable measuring device as claimed in claim 19, wherein said measuring point is adapted to be substantially stationary when aligned by a user with a selected spatial location.

22. The portable measuring device as claimed in claim 21, wherein processor is adapted to determine an error correction when said measuring point is aligned with a selected spatial location and is substantially stationary, in relation to motion detected by said one or more motion sensors.

23. The portable measuring device as claimed in claim 19, wherein the processor is in communication with a volatile memory in which is stored calibration data and the processor is adapted to update calibration data stored in said volatile memory at a second or subsequent location.

24. The portable measuring device as claimed in claim 23, wherein said processor is adapted to adjust for movement of the one or more motion sensors as a result of uncontrolled hand movements of the user when updating calibration data stored in said volatile memory.

25. A portable measuring device as claimed in claim 19, wherein said one or more motion sensors comprise at least three accelerometers and three angular rate sensors.

26. The portable measuring device as claimed in claim 19, further including a timer, in communication with the processor, for monitoring the time duration of a measurement wherein the processor is adapted to determine the measure of relative spatial separation to a resolution dependent upon the time duration of the measurement.

27. The portable measuring device as claimed in claim 19, wherein the processor is adapted to determine from information received from the motion sensors when the measuring device is stationary and to generate an error correction.

28. The portable measuring device as claimed in claim 19, wherein the processor has access to threshold data identifying lower limits of measurable spatial movement representative of small, uncontrolled hand movements of a user.

29. The portable measuring device as claimed in claim 19, further comprising a deceleration device for reducing high deceleration forces.

30. The portable measuring device as claimed in claim 19, wherein the processor is adapted to supply real time data on the measured relative spatial separation.

31. The portable measuring device as claimed in claim 19, wherein the processor additionally includes a data store in which motion data is stored and said processor is adapted to update said stored motion data in dependence on calculated error corrections or updated calibration data and to recalculate said measured spatial separation in dependence on the updated motion data.

32. The portable measuring device as claimed in claim 19, further including a non-contact distance meter for measuring a distance to a position remote from the measuring device, the position being at least one of said first and second locations.

* * * * *